US00RE36542E

United States Patent [19]

Painter, Jr. et al.

[11] E Patent Number: Re. 36,542

[45] Reissued Date of Patent: Feb. 1, 2000

[54] RAILROAD SWITCH STAND HAVING IMPROVED HANDLE MEANS

[75] Inventors: Thomas P. Painter, Jr., Lawrenceville, Ga.; Gary A. Obenchain, Moneta, Va.; Morris L. Myers, Roanoke, Va.; Charles S. Christy, Roanoke, Va.; James D. Rhodes, Roanoke, Va.

[73] Assignee: Norfolk Southern Railway Co., Norfolk, Va.

[21] Appl. No.: 08/999,673

[22] Filed: Aug. 27, 1997

Related U.S. Patent Documents

Reissue of:

[64] Patent No.: 5,480,112
Issued: Jan. 2, 1996
Appl. No.: 08/326,231
Filed: Oct. 20, 1994

[51] Int. Cl.[7] ..... B61L 5/00

[52] U.S. Cl. ..... 246/410

[58] Field of Search ..... 246/407, 408, 246/409, 410, 411, 412, 413, 414, 404

[56] References Cited

U.S. PATENT DOCUMENTS

| | | | |
|---|---|---|---|
| 256,798 | 4/1882 | Gray et al. | 246/410 |
| 401,671 | 4/1889 | Alkins . | |
| 568,938 | 10/1896 | Calvert | 246/414 |
| 569,730 | 10/1896 | Wagner . | |
| 587,689 | 8/1892 | Abernethy . | |
| 690,787 | 1/1902 | Spangler . | |
| 885,160 | 4/1908 | Kidd . | |
| 1,783,069 | 11/1930 | Becker . | |
| 2,610,291 | 9/1952 | McGarry | 246/410 |
| 4,824,054 | 4/1989 | Kohake et al. . | |
| 4,938,438 | 7/1990 | Farrell et al. . | |
| 5,014,937 | 5/1991 | Peters . | |
| 5,419,518 | 5/1995 | Fiorenzo . | |

FOREIGN PATENT DOCUMENTS

| | | |
|---|---|---|
| 2378974 | 8/1978 | France . |

OTHER PUBLICATIONS

ABC Rail Corporation Drawing, Model No. 22–P Switch Stand Apr. 14, 1992.

*Primary Examiner*—Mark T. Le
*Attorney, Agent, or Firm*—Watson Cole Grindle Watson, P.L.L..

[57] ABSTRACT

A railroad switch stand is provided for operating a railroad switch between two positions. The switch stand comprises a connecting rod connected to an operating mechanism for causing reciprocation of the connecting rod, and a handle connected to the operating mechanism for pivotal movement about a pivot axis between two operative positions. The handle has an open framework having an external configuration which is generally triangular in shape, with the apex of the triangle disposed at the inner end of the handle part where it is connected to a stub portion of the handle. With this configuration, the outer end of the handle presents a portion extending upwardly which can be easily grasped by a railroad personnel when it is desired to throw a switch.

4 Claims, 1 Drawing Sheet

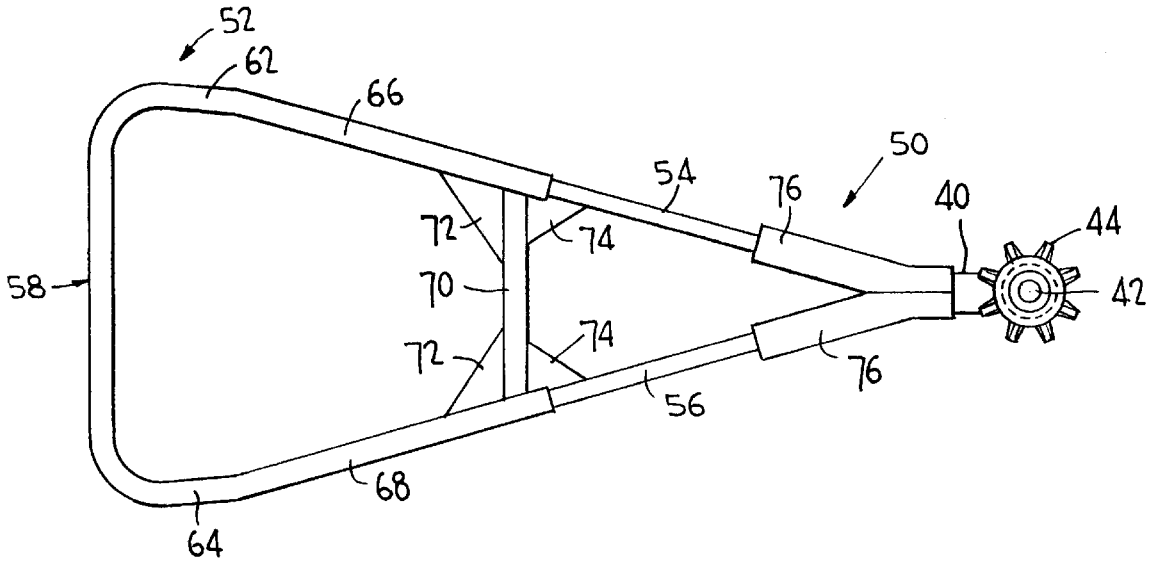
52
62
66
50
54
76
40
44
42
58
72
74
70
74
72
76
56
68
64
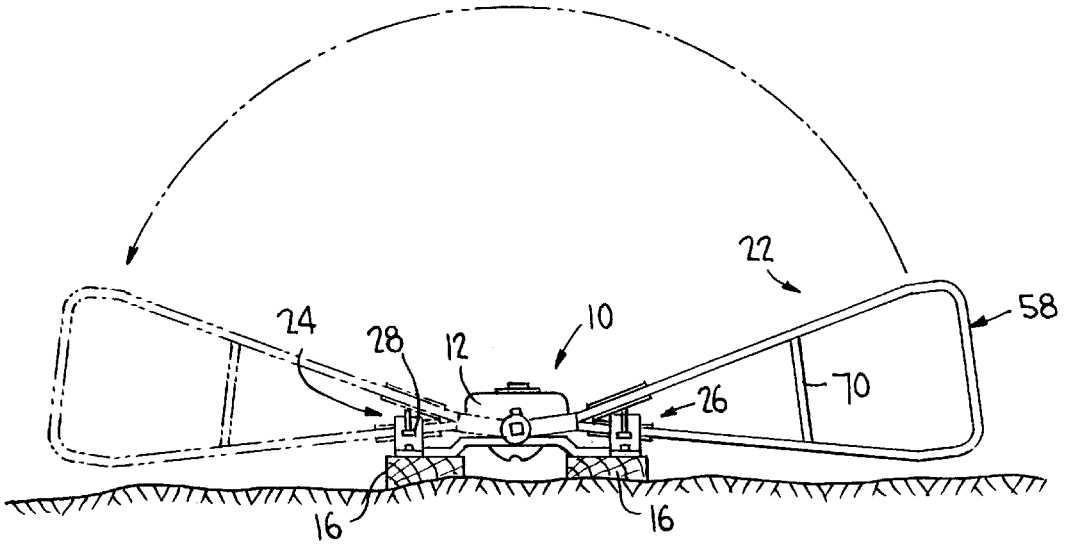
22
58
24
28
12
10
26
70
16
16

RAILROAD SWITCH STAND HAVING IMPROVED HANDLE MEANS

Matter enclosed in heavy brackets [ ] appears in the original patent but forms no part of this reissue specification; matter printed in italics indicates the additions made by reissue.

BACKGROUND OF THE INVENTION

The present invention relates to railroad switch stands for operating railroad switches, and more particularly to manually operated switch stands which include a handle means in the form of a throwing lever which is usually formed of a heavy metal bar which may have a weight at the outer end thereof. This type of switch stand is disadvantageous primarily because a great deal of force is required to throw the switch. This has resulted in injuries of railroad personnel caused by actual throwing of the switch. Such injuries are due to the heavyweight of the handle means and are compounded by the necessity of bending over to an excessive extent in order to grasp the handle means which is spaced only a short distance above the ground.

SUMMARY OF THE INVENTION

According to the present invention, the prior art handle means of the lever type is redesigned enabling the operator to throw the switch with greater ease and under safer conditions. The present handle is lighter in weight and its shape is such that in either of its two operative positions, the handle means includes a portion which extends upwardly a substantial distance above the ground to thereby minimize the amount of bending required to grasp the handle.

The handle part of the invention is formed of a combination of solid and tubular metallic portions which provide the necessary strength while slightly reducing the weight of the handle means. Such portions include a cross-member which rigidifies the structure of the handle means. Wear plates are also provided at the inner end of the handle structure to avoid undue deterioration each time the handle engages conventional latch means at the switch.

The tubular and solid portions form an open framework having an external configuration which is generally triangular in shape, with the apex of the triangle disposed at the inner end of the handle part where it is connected to a stub portion of the handle means. With this construction, the outer end of the handle means presents a portion extending upwardly which can be readily grasped by railroad personnel when it is desired to throw a switch. It has been found that the force required to operate a switch stand according to the present invention is approximately one-half that required to operate a prior art switch stand having a conventional lever type handle means.

BRIEF DESCRIPTION OF THE DRAWINGS

FIG. 1 is a front view of the handle means of the invention;

FIG. 2 is a top view of the handle means shown in FIG. 1;

FIG. 3 is a front view of a railroad switch stand incorporating the handle means of the invention; and FIG. 4 is a top view of the switch stand shown in FIG. 3.

DESCRIPTION OF THE PREFERRED

Referring now to the drawing wherein like reference characters designate corresponding parts throughout the several views, there is shown in FIGS. 3 and 4 a switch stand of conventional construction indicated generally by reference numeral 10 and including a cover 12 and a bottom part 14 which is supported on pair of headblock ties 16 extending laterally outwardly of the usual railroad ties (not shown). The bottom part of the switch stand is connected to the headblock ties by a plurality of track spikes or bolts 18 which pass through suitable holes provided through laterally extending flanges formed on die bottom part.

A conventional connecting rod 20 has one end operatively connected to the switch stand in the usual manner, and the opposite end of the connecting rod is connected to a railroad switch. The connecting rod is adapted to be reciprocated in opposite directions as indicated by arrow A, and is reciprocated in response to pivotal movement of the handle means indicated generally by reference numeral 22. The handle means is adapted to be latched in its two operative positions indicated in FIG. 3 by full lines and phantom lines by conventional latch stands 24 and 26 which are provided with foot pedals 28 and 30 respectively for selectively releasing the latch stands when desired to allow the handle means to pivot into a different operative position when desired. Latch stands 24 and 26 are supported on the headblock ties and are secured in place by suitable studs 30 and 32 respectively which extend through suitable holes provided in the bases of the latch stands.

Referring now to FIGS. 1 and 2, the handle means of the invention is illustrated. The handle means includes a portion 40 formed of a heavy metal bar. Stub portion 40 is connected to a pinion shaft 42 having a pinion gear 44 fixed to one end thereof. The pinion shalt is supported for rotation by the switch stand in the usual manner, and the pinion gear engages a conventional segment gear of the switch stand. The handle means 22 is accordingly mounted for pivotal movement about a pivot axis extending longitudinally through the center of the pinion shaft 42.

The handle means includes an inner end indicated generally by reference numeral 50 which is adjacent the pivot axis of the handle means. The handle means also includes an outer end indicated generally by reference number 52 which is disposed remote from the pivot axis. The inner end 50 has a first dimension extending along an are having the pivot axis as its center, and the outer end 52 has a second dimension extending along an are having the pivot axis as its center. The second dimension is many times greater than first dimension to define a handle means which is of generally triangular configuration which can be clearly seen in FIG. 1.

The handle part which is connected to stub portion 40 comprises a pair of angularly related members 54, 56 which may be of one inch solid steel of either round or rectangular cross-section, as desired. Members 54, 56 extend away from the pivot axis and diverge from one another. The handle part further comprises a bent tubular member 58 which may be of one and one-quarter inch tubular steel having a bight portion 60, opposing essentially perpendicular sections 62 and 64, and legs 66 and 68 forming extensions of members 54, 56. Legs 66 and 68 are respectively telescoped over members 54 and 56 and welded thereto.

In order to rigidify the handle means, a tubular cross-member 70, which may be if one and one-quarter inch tubular steel, has the opposite ends thereof connected by welding to legs 66 and 68 adjacent to ends thereof. Gusset plates 72 are welded to cross-member 70 and legs 66 and 68, and gusset plates 74 are welded to cross-member 70 and 60 members 54 and 56, to enhance the rigidity and stability of the handle.

The inner end 50 of the handle means is provided with steel wear plates 76 surrounding and welded to portion 40 and inner sections of members 54 and 56, the wear plates serving to avoid wear due to abrasion when engaging foot pedals 28 and 30 and the opposing stops as shown in FIG. 4 when the switch handle is thrown between its solid outline and phantom outline positions of FIG. 3.

A handle part of the switch handle according to the invention is fabricated to include an inner end having a pair of solid steel members disposed adjacent one another and diverging from one another in a direction away from die inner end to outer ends which are connected to a tubular steel member having a tubular bight position thereby defining a generally triangular configuration. A tubular cross-member is connected between the legs of the tubular member at to rigidify the construction, and wear plates are fixed to the inner ends of the solid steel members and to the steel portion to avoid undue wear od the switch handle during operation.

The invention has been described with reference to a preferred embodiment. Obviously, various modifications, alterations and other embodiments will occur to others upon reading and understanding this specification. It is our intention to include all such modifications, alterations and alternate embodiments insofar as they come within the scope of the appended claims or the equivalent thereof.

What is claimed is:

[1. A railroad switch stand for operating a railroad switch between two positions, said switch stand including a connecting rod, operating means for causing reciprocation of said connecting rod and handle means connected with said operating means for pivotal movement about a pivot axis between two operative positions, said handle means having an inner end adjacent said pivot axis and an outer end remote from said pivot axis, and said handle means including a pair of inner steel portions and an outer bent tubular portion having legs forming extensions of said steel portions, said inner end having a first dimension extending along an are having said pivot axis as its center, said outer end having a second dimension extending along an arc having said pivot axis as its center, said second dimension being many times greater than said first dimension to facilitate grasping of the handle in either of its operative positions.]

[2. A switch stand as defined in claim 1 wherein said handle means is of generally triangular configuration in an upstanding direction.]

[3. A switch stand as defined in claim 1 wherein said handle means includes a portion of tubular construction to reduce weight and thereby reduce the amount of effort required to move the handle means.]

[4. A switch stand as defined in claim 1 including wear plate means disposed at the inner end of said handle means.]

[5. A switch stand as defined in claim 1 wherein wear plates are connected to said inner portions to avoid wear of the handle means during operation.]

6. A railroad switch stand for operating a railroad switch between two positions, said switch stand including a connecting rod, operating means for causing reciprocation of said connecting rod and handle means connected with said operating means for pivotal movement about a pivot axis between two *extreme* operative positions, said handle means having an inner end adjacent said pivot axis and an outer end remote from said pivot axis, said inner end including a stub portion and a pair of *divergent* steel portions connected to said stub portion and extending away from said pivot axis so as to diverge from one another, and said outer end including a bent tubular portion having a pair of legs forming extensions of said steel portions, and a tubular bight portion extending between said pair of legs, *a pair of latch stands respectively located on opposite sides of said pivot axis in the path of movement of said handle means, each of said latch stands being spaced from said pivot axis a predetermined distance for respectively engaging said divergent steel portions for latching said handle in said extreme operative positions*.

7. A switch stand as defined in claim 6 wherein said steel portions and said bent tubular portion together define a generally triangular configuration.

8. A switch stand as defined in claim 6 wherein *said divergent steel portions are solid steel portions, and* wear plates are connected to said solid steel portions and said stub portion.

9. A switch stand as defined in claim 7 including a cross-member connected between said pair of legs spaced a substantial distance from said stub portion and said tubular bight portion.

* * * * *

UNITED STATES PATENT AND TRADEMARK OFFICE

CERTIFICATE OF CORRECTION

PATENT NO. : RE 36,542
DATED : February 1, 2000
INVENTOR(S) : Painter, Jr. et al.

It is certified that error appears in the above-identified patent and that said Letters Patent is hereby corrected as shown below:

Drawings,

The drawings in the patent should be deleted to appear as per figures 1-4:

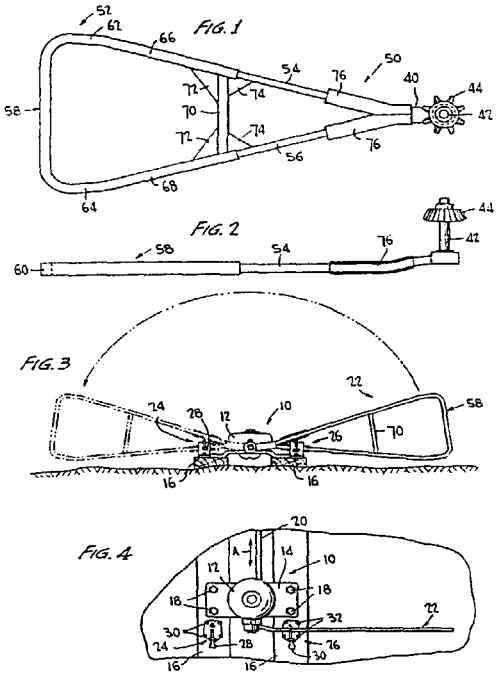

Signed and Sealed this

Eleventh Day of February, 2003

JAMES E. ROGAN
*Director of the United States Patent and Trademark Office*